US012785878B2

(12) United States Patent
Liu

(10) Patent No.: US 12,785,878 B2
(45) Date of Patent: Nov. 3, 2026

(54) COMMUNICATION METHOD FOR PUSCH, COMMUNICATION APPARATUS FOR PUSCH, AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 206 days.

(21) Appl. No.: 18/284,431

(22) PCT Filed: Mar. 31, 2021

(86) PCT No.: PCT/CN2021/084759
§ 371 (c)(1),
(2) Date: Sep. 27, 2023

(87) PCT Pub. No.: WO2022/205233
PCT Pub. Date: Oct. 6, 2022

(65) Prior Publication Data
US 2024/0171331 A1 May 23, 2024

(51) Int. Cl.
*H04L 5/00* (2006.01)
*H04W 72/23* (2023.01)

(52) U.S. Cl.
CPC .......... *H04L 5/0048* (2013.01); *H04L 5/0035* (2013.01); *H04W 72/23* (2023.01)

(58) Field of Classification Search
CPC ..... H04L 5/0048; H04L 5/0035; H04W 72/23
USPC .......................................................... 370/329
See application file for complete search history.

(56) References Cited

U.S. PATENT DOCUMENTS

2021/0226680 A1* 7/2021 Khoshnevisan ..... H04B 7/0404

OTHER PUBLICATIONS

PCT/CN2021/084759, International Search Report dated Jan. 6, 2022, 3 pages.
Huawei et al. "Enhancements on multi-TRP for reliability and robustness in Rel-17" 3GPP TSG-RAN WG1 Meeting #104-e, R1-2100209, Jan.-Feb. 2021, 14 pages.
ZTE "Enhancements on Multi-TRP for PDCCH, PUCCH and PUSCH" 3GPP TSG-RAN WG1 Meeting #104-e, R1-2100286, Jan.-Feb. 2021, 25 pages.
LG Electronics "Enhancements on Multi-TRP for PDCCH, PUCCH and PUSCH " 3GPP TSG-RAN WG1 Meeting #104-e, R1-2100619, Jan.-Feb. 2021, 8 pages.
Intel Corp." Multi-TRP enhancements for PDCCH, PUCCH and PUSCH" 3GPP TSG RAN WG1 Meeting #104-e, R1-2100637, Jan.-Feb. 2021, 17 pages.
(Continued)

*Primary Examiner* — Christopher R Crompton
(74) *Attorney, Agent, or Firm* — Cozen O'Connor

(57) ABSTRACT

A communication method for a PUSCH includes: sending a first activation indication in response to sounding reference signal (SRS) resource sets corresponding to a plurality of cooperative transmission and reception points (TRPs) being configured. The first activation indication is configured to indicate a PUSCH transmission mode associated with the plurality of TRPs, and the PUSCH transmission mode includes the terminal independently transmitting the PUSCH to a single TRP or cooperatively transmitting the PUSCH to the plurality of TRPs.

20 Claims, 4 Drawing Sheets

(56) References Cited

OTHER PUBLICATIONS

NEC "Discussion on multi-TRP for PDCCH, PUCCH and Pusch" 3GPP TSG-RAN WG1 Meeting #104-e, R1-2100950, Jan.-Feb. 2021, 5 pages.

Xiaomi "Enhancements on Multi-TRP for PDCCH, PUCCH and PUSCH" 3GPP TSG-RAN WG1 Meeting #104-e, R1-2101093, Jan.-Feb. 2021, 19 pages.

Qualcomm Inc. "Enhancements on Multi-TRP for PDCCH, PUCCH and PUSCH " 3GPP TSG-RAN WG1 Meeting #104-e, R1-2101447, Jan.-Feb. 2021, 28 pages.

Ericsson "On PDCCH, PUCCH and PUSCH enhancements" 3GPP TSG-RAN WG1 Meeting #104-e, R1-2101654, Jan.-Feb. 2021, 24 pages.

European Patent Application No. 21933893.6 Search Report dated Apr. 10, 2024, 11 pages.

Vivo, "Enhancements on Multi-TRP for PDCCH, PUCCH and PUSCH", 3GPP TSG RAN WG1 #104-e, R1-2100422, Jan. 2021, 28 pages.

Fraunhofer Iis et al., "On multi-TRP enhancements for PDCCH and PUSCH", 3GPP TSG RAN WG1 Meeting #104-e, R1-2100535, Jan. 2021, 13 pages.

* cited by examiner

COMMUNICATION METHOD FOR PUSCH, COMMUNICATION APPARATUS FOR PUSCH, AND STORAGE MEDIUM

CROSS-REFERENCE TO RELATED APPLICATIONS

The present application is a national phase entry under 35 USC § 371 of International Application PCT/CN2021/084759, filed Mar. 31, 2021, the entire disclosures of which are incorporated herein by reference.

TECHNICAL FIELD

The present disclosure relates to communications, and more particularly to a communication method for a physical uplink shared channel (PUSCH), a communication apparatus for a PUSCH and a storage medium.

SUMMARY

With the development of communication technology, in order to ensure coverage range, it is required to adopt beam-based transmission and reception. When a network device (such as a base station) has multiple transmission and reception points (TRPs), the multiple TRPs (multi-TRPs)/multiple PANELs may be used to provide services to the terminal. The application of multi-TRPs/PANELs in the network device is generally aimed at improving coverage at an edge of a cell, providing more balanced service quality within the service area, and cooperatively transmitting data between the multiple TRPs/PANELs in different ways. From a perspective of network morphology, it is beneficial to perform network deployment with a large number of distributed access points and a centralized baseband process for providing a balanced user experience rate and significantly reducing latency and signaling overhead caused by handover. By utilizing the cooperation between the multiple TRPs/PANELs, transmitting/receiving the channels from a plurality of beams at a plurality of angles may better overcome various occlusion/blocking effects, and ensure the robustness of link connections, which is suitable for ultra-reliable low latency communication (URLLC) services to improve transmission quality and meet reliability requirements.

In the research of R16, based on the application of multi-point cooperative transmission technology between the downlink multiple TRPs/PANELs, transmission on a physical downlink shared channel (PDSCH) is enhanced. Since the data transmission includes scheduling feedback for both the uplink channel and the downlink channel, in the research of URLLC, only enhancing the downlink data channel cannot guarantee business performance. Therefore, in the research of R17, it is required to further enhance a physical downlink control channel (PDCCH), a physical uplink control channel (PUCCH), and a physical uplink shared channel (PUSCH).

Based on the PUSCH enhancement of the multi-TRPs, a main solution of the PUSCH transmission based on single downlink control information (DCI) control is that two independent sounding reference signal resource indicator (SRI) domains used in DCI0_1/0_2 respectively correspond to SRI indicators for different TRPs to control the PUSCH transmission to the different TRPs. For the PUSCH transmission enhancement for multi-TRPs based on the single DCI, similar to the downlink PDSCH, it is required to support dynamic switching between the single TRP and the multi-TRPs, so as to better adapt to transmission scenarios and actual channel conditions.

However, for the enhanced multi-TRPs PUSCH transmission, how to dynamically switch between the single TRP and the multi-TRPs, and how to support flexible indication of the TRP to which the PUSCH is transmitted is an issue that need to be addressed.

In order to overcome problems in a related art, the present disclosure provides a communication method for a physical uplink shared channel (PUSCH), a communication apparatus for a physical uplink shared channel (PUSCH) and a storage medium.

According to a first aspect of the present disclosure, a communication method for a physical uplink shared channel (PUSCH) is provided, which is applied to a network device. The communication method for the PUSCH includes:

sending a first activation indication in response to configuring, for a terminal, sounding reference signal (SRS) resource sets corresponding to a plurality of cooperative transmission and reception points (TRPs). The first activation indication is configured to indicate a PUSCH transmission mode associated with the plurality of TRPs, and the PUSCH transmission mode includes the terminal independently transmitting the PUSCH to a single TRP or cooperatively transmitting the PUSCH to the plurality of TRPs.

According to a second aspect of the present disclosure, a communication method for a physical uplink shared channel (PUSCH) is provided, which is applied to a terminal. The communication method for the PUSCH includes: receiving a first activation indication, in which the first activation indication is configured to indicate a PUSCH transmission mode associated with a plurality of cooperative transmission and reception points (TRPs). The PUSCH transmission mode includes the terminal independently transmitting the PUSCH to a single TRP or cooperatively transmitting the PUSCH to the plurality of TRPs. The method also includes independently transmitting the PUSCH based on the single TRP activated by the first activation indication, or cooperatively transmitting the PUSCH to the plurality of TRPs based on the plurality of TRPs activated by the first activation indication.

According to a third aspect of the present disclosure, a communication device for a physical uplink shared channel (PUSCH) is provided, which includes: a processor; and a memory storing executable instructions that, when executed by the processor, cause the processor to implement the communication method for the PUSCH according to the first aspect or any one embodiment of the first aspect.

According to a fourth aspect of the present disclosure, a communication device for a physical uplink shared channel (PUSCH) is provided, which includes: a processor; and a memory storing executable instructions that, when executed by the processor, cause the processor to implement the communication method for the PUSCH according to the second aspect or any one embodiment of the second aspect.

It is understood that both the foregoing general description and the following detailed description are illustrative and explanatory only, and are not intended to limit embodiments of the present disclosure.

BRIEF DESCRIPTION OF THE DRAWINGS

The accompanying drawings, which are incorporated in and constitute a part of this specification, illustrate embodiments consistent with the present disclosure and together with the specification serve to explain principles of embodiments of the present disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to embodiments of the disclosure as recited in the appended claims.

Figure 1:
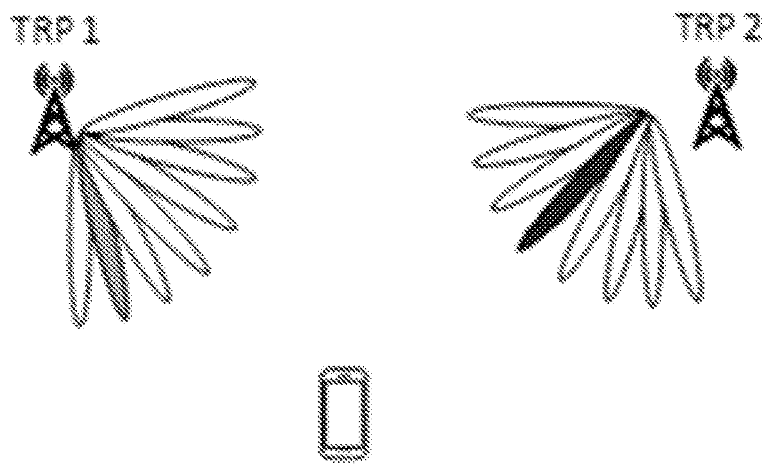
FIG. 1 is a schematic diagram illustrating a wireless communication system according to an illustrative embodiment.

A communication method for a physical uplink shared channel (PUSCH) provided by embodiments of the present disclosure may be applied to a wireless communication system shown in FIG. 1. Referring to FIG. 1, the wireless communication system includes a network device and a terminal. The terminal is connected to the network device via wireless resources to transmit data. The data transmission is carried out between the network device and the terminal based on beams. PUSCH uplink transmission may be enhanced based on multi-TRPs between the network device and the terminal.

It is understood that the number of the TRPs used by the network device to transmit data to the terminal based on the multi-TRPs may be one or more. The data transmission between the network device and the terminal based on TRP1 and TRP2 in the wireless communication system shown in FIG. 1 is only for a schematic illustration and is not limiting.

It is further understood that the wireless communication system shown in FIG. 1 is only for schematic illustration, and the wireless communication system may also include other network devices, such as core network devices, wireless relay devices, and wireless backhaul devices, and the like, which are not shown in FIG. 1. The number of the network devices and the terminals included in the wireless communication system is not limited in embodiments of the present disclosure.

It is further understood that the wireless communication system in embodiments of the present disclosure is a network that provides wireless communication functions. The wireless communication system may use different communication technologies, such as code division multiple access (CDMA), wideband code division multiple access (WCDMA), time division multiple access (TDMA), frequency division multiple access (FDMA), orthogonal frequency-division multiple access (OFDMA), single carrier frequency-division multiple access (single carrier FDMA, SC-FDMA), carrier sense multiple access with collision avoidance. According to capacity, speed, delay and other factors of the different networks, the network may be divided into a $2^{nd}$ generation (2G) network, a 3G network, a 4G network or a future evolution network, such as a 5G network. The 5G network may also be called a new radio (NR). For convenience of description, sometimes, the wireless communication network is simply referred to as a network in the present disclosure.

Furthermore, the network device involved in the present disclosure may also be called a wireless access network device. The wireless access network device may be: a base station, an evolved base station (evolved node B, base station), a home base station, an access point (AP) in a wireless fidelity (WIFI) system, a wireless relay node, a wireless backhaul node, a transmission point (TP) or a transmission and reception point (TRP), etc., or may also be a gNB in an NR system, or may also be a component or a part of device that constitutes the base station. It is understood that in embodiments of the present disclosure, the specific technology and the specific device form adopted by the network device are not limited. In the present disclosure, the network device may provide communication coverage for a specific geographic area, and may communicate with terminals located in the coverage area (cell). In addition, when it is a vehicle-to-everything (V2X) communication system, the network device may also be a vehicle-mounted device.

Further, the terminals involved in the present disclosure may also be referred to as a terminal device, a user equipment (UE), a mobile station (MS), a mobile terminal (MT), etc., which is a device providing voice and/or data connectivity to a user. For example, the terminal may be a device with a wireless connection function, e.g., a handheld device, a vehicle-mounted device, and the like. Currently, examples of some terminals are: a mobile phone, a customer premise equipment (CPE), a pocket personal computer (PPC), a handheld computer, a personal digital assistant (PDA), a laptop, a tablet, a wearable device, or a vehicle-mounted device, etc. In addition, when it is a vehicle-to-everything (V2X) communication system, the terminal device may also be a vehicle-mounted device. It is understood that the specific technology and specific device form used by the terminal are not limited in embodiments of the present disclosure.

In the present disclosure, data transmission between the network device and the terminal is performed based on beams. PUSCH uplink transmission may be enhanced based on multi-TRPs between the network device and the terminal. At present, it is mainly based on PUSCH transmission controlled by a single DCI. The main manner of controlling the PUSCH transmission based on the single DCI is to use two independent SRI domains in DCI0_1/0_2 to correspond to SRI indications to different TRPs respectively, so as to control the PUSCH transmission to the different TRPs.

In a related art, an uplink transmission scheme of PUSCH includes a codebook-based uplink transmission scheme and a non-codebook-based uplink transmission scheme.

In the NR system, the network device may configure at most one sounding reference signal (SRS) resource set for the terminal for the codebook-based uplink transmission, which is realized by configuring one SRS resource set as a codebook. When the network device schedules the PUSCH via DCI format 0_1, and the network device configures two SRS resources for codebook-based uplink transmission for the terminal, the terminal determines precoding and the number of transmission streams of the PUSCH according to the SRI and transmission precoding matrix indicator (TPMI)/transmission rank indicator (TRI), and maps a data stream to a port of the SRS resource indicated by the SRI via the determined precoding for transmission. The SRI and TPMI/TRI indicators are the SRS resource indicator and precoding information and number of layers in the DCI respectively. In case of presence of the SRI, the SRI may only indicate that the network device configures one SRS resource among the plurality of SRS resources for codebook-based uplink transmission for the terminal. When the network device schedules the PUSCH via DCI format 0_1, and the network device configures only one SRS resource for codebook-based uplink transmission for the terminal, there is no SRI indication.

The data in the uplink transmission of the terminal needs to be precoded using the precoding matrix indicator (PMI) and layer indicator (RI) specified by the network side. At the same time, the precoded data is mapped to the corresponding antenna port according to spatial relation info corresponding to the SRS resources indicated by the SRI. The RI is sometimes also referred to as an indicator of the number of data layers, or an indicator of the number of transmission layers. Those skilled in the art could understand the consistency of their meanings.

Table 1 is an example showing an indicating process for the plurality of SRS resources through the SRI. Table 2 shows a signaling indication manner of TPMI and RI for single-layer transmission with 4 antenna ports, and different UE capabilities are indicated respectively. Here, UE capabilities are divided into three types: full correlation, partial correlation, and non-correlation, which represent correlation capabilities of the antenna ports. Table 3 corresponds to codewords for single-layer transmission with 4 antenna ports.

TABLE 1

| Bit field mapped to index | SRI(s), $N_{SRS} = 2$ |
|---|---|
| 0 | 0 |
| 1 | 1 |

TABLE 2

| Bit field mapped to index | codebookSubset = fullyAndPartialAndNonCoherent | Bit field mapped to index | codebookSubset = partialAndNonCoherent | Bit field mapped to index | codebookSubset = nonCoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| . . . | . . . | . . . | . . . | . . . | . . . |
| 3 | 1 layer: TPMI = 3 | 3 | 1 layer: TPMI = 3 | 3 | 1 layer: TPMI = 3 |
| 4 | 1 layer: TPMI = 4 | 4 | 1 layer: TPMI = 4 | | |
| . . . | . . . | . . . | . . . | | |
| 11 | 1 layer: TPMI = 11 | 11 | 1 layer: TPMI = 11 | | |
| 12 | 1 layers: TPMI = 12 | 12-15 | reserved | | |
| . . . | . . . | | | | |
| 27 | 1 layers: TPMI = 27 | | | | |
| 28-31 | reserved | | | | |

TABLE 3

| TPMI index | W (ordered from left to right in increasing order of TPMI index) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

In a NR system, the network device may configure at most one SRS resource set for the terminal for non-codebook-based uplink transmission, which is achieved by configuring one SRS resource set as a non-codebook. For the non-codebook uplink transmission, the terminal sends a capability of transmitting a maximum number of the SRS resources simultaneously to the network device. This resource set may be configured with up to 4 SRS resources, and each SRS resource contains one SRS port. The network device may indicate one or more SRS resources for the terminal through the SRI for determining precoding of the PUSCH. The number of the SRS resources corresponding to the SRI is the number of streams for the PUSCH transmission. When the network device configures only one SRS resource for the terminal for the non-codebook uplink transmission, DCI format 0_1 does not contain SRI, and the terminal determines the precoding of the PUSCH based on the configured SRS resource.

The following is a table showing the SRI indication corresponding to the non-codebook and the codebook transmission in the protocol.

TABLE 4

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| 0 | 0 | 0 | 0 | 0 | 0 |
| 1 | 1 | 1 | 1 | 1 | 1 |
| | | 2 | 2 | 2 | 2 |
| | | 3 | reserved | 3 | 3 |

TABLE 5

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
| | | 4 | 0, 2 | 4 | 0, 1 |
| | | 5 | 1, 2 | 5 | 0, 2 |
| | | 6-7 | reserved | 6 | 0, 3 |
| | | | | 7 | 1, 2 |
| | | | | 8 | 1, 3 |
| | | | | 9 | 2, 3 |
| | | | | 10-15 | reserved |

TABLE 6

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
| | | 4 | 0, 2 | 4 | 0, 1 |
| | | 5 | 1, 2 | 5 | 0, 2 |
| | | 6 | 0, 1, 2 | 6 | 0, 3 |
| | | 7 | reserved | 7 | 1, 2 |
| | | | | 8 | 1, 3 |
| | | | | 9 | 2, 3 |
| | | | | 10 | 0, 1, 2 |

TABLE 6-continued

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| | | | | 11 | 0, 1, 3 |
| | | | | 12 | 0, 2, 3 |
| | | | | 13 | 1, 2, 3 |
| | | | | 14-15 | reserved |

TABLE 7

| Bit field mapped to index | SRI(s), $N_{SRS}$ = 2 | Bit field mapped to index | SRI(s), $N_{SRS}$ = 3 | Bit field mapped to index | SRI(s), $N_{SRS}$ = 4 |
|---|---|---|---|---|---|
| 0 | 0 | 0 | 0 | 0 | 0 |
| 1 | 1 | 1 | 1 | 1 | 1 |
| 2 | 0, 1 | 2 | 2 | 2 | 2 |
| 3 | reserved | 3 | 0, 1 | 3 | 3 |
| | | 4 | 0, 2 | 4 | 0, 1 |
| | | 5 | 1, 2 | 5 | 0, 2 |
| | | 6 | 0, 1, 2 | 6 | 0, 3 |
| | | 7 | reserved | 7 | 1, 2 |
| | | | | 8 | 1, 3 |
| | | | | 9 | 2, 3 |
| | | | | 10 | 0, 1, 2 |
| | | | | 11 | 0, 1, 3 |
| | | | | 12 | 0, 2, 3 |
| | | | | 13 | 1, 2, 3 |
| | | | | 14 | 0, 1, 2, 3 |
| | | | | 15 | reserved |

TABLE 8

| Bit field mapped to index | SRI(s), $N_{SRS}$ = 2 |
|---|---|
| 0 | 0 |
| 1 | 1 |

TABLE 9

| Bit field mapped to index | SRI(s), $N_{SRS}$ = 3 |
|---|---|
| 0 | 0 |
| 1 | 1 |
| 2 | 2 |
| 3 | Reserved |

TABLE 10

| Bit field mapped to index | SRI(s), $N_{SRS}$ = 4 |
|---|---|
| 0 | 0 |
| 1 | 1 |
| 2 | 2 |
| 3 | 3 |

The above-mentioned communication method for the PUSCH, codebook-based or non-codebook-based, may be based on the multi-TRPs for the PUSCH enhancement. Currently, the main solution for controlling the PUSCH transmission based on the single DCI is to use two independent SRI domains in DCI0_1/0_2 to correspond to SRI indicators for the different TRPs, so as to control the PUSCH transmission to the different TRPs. For the PUSCH transmission enhancement based on the multi-TRPs of the single DCI, it is needed to support dynamic switching between the single TRP and the multi-TRPs to better adapt to transmission scenarios and actual channel conditions. For example, in case of performing PUSCH transmission based on the multi-TRPs, according to the actual channel and the service conditions, the network device may quickly schedule this PUSCH transmission using the single TRP transmission via a signaling. Further, in case of the transmission being based on the single TRP, it is needed to support flexibly indicating the TRP to which the PUSCH is transmitted.

In a related art, the TRP to which the PUSCH is transmitted may be indicated based on the SRI or the TPMI. However, when the SRI domain is used to indicate whether the current TRP is activated for use, a reserved codepoint may be used for indication. However, there is currently a situation where the corresponding SRI table does not correspond to the reserved codepoint in case of many SRIs. In addition, in case of codebook, when the TPMI domain is used to indicate whether the current TRP is activated for use, the reserved codepoint may be used for indication. However, there is currently a situation where the corresponding TPMI table does not correspond to the reserved codepoint in case of many TPMIs.

In view of this, embodiments of the present disclosure provide a communication method for PUSCH. In case that the terminal is configured with SRS resource sets corresponding to a plurality of cooperative TRPs, an activation indication is sent through the network device, such that the terminal is configured to, in the plurality of cooperative TRPs, independently transmit the PUSCH to a single TRP or cooperatively transmit the PUSCH to the plurality of TRPs, thereby realizing dynamic switching between the single TRP and the plurality of TRPs.

In embodiments of the present disclosure, for convenience of description, the activation indication sent by the network device is referred to as a first activation indication.

Figure 2:
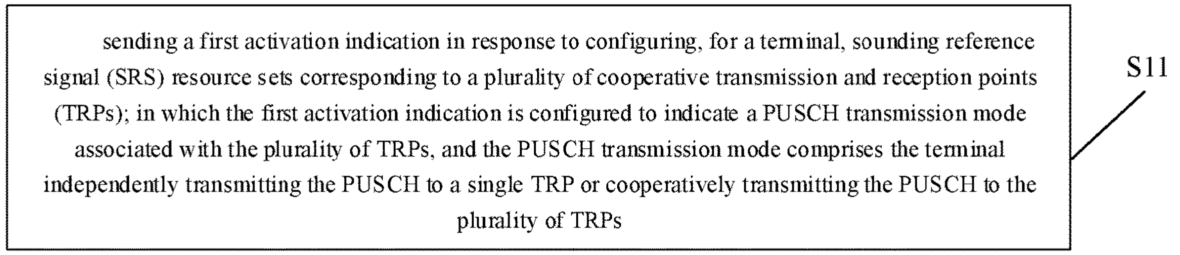
FIG. 2 is a flowchart illustrating a communication method for PUSCH according to an illustrative embodiment.

FIG. 2 is a flowchart illustrating a communication method for PUSCH according to an illustrative embodiment. As shown in FIG. 2, the communication method for the PUSCH includes the following steps.

In step S11, a first activation indication is sent in response to configuring, for a terminal, sounding reference signal (SRS) resource sets corresponding to a plurality of cooperative transmission and reception points (TRPs).

The first activation indication is configured to indicate a PUSCH transmission mode associated with the plurality of TRPs, and the PUSCH transmission mode includes the terminal independently transmitting the PUSCH to a single TRP or cooperatively transmitting the PUSCH to the plurality of TRPs.

In embodiments of the present disclosure, in the plurality of cooperative TRPs configured for the terminal, the terminal may independently transmit the PUSCH to the single TRP or cooperatively transmit the PUSCH to the plurality of TRPs.

In embodiments of the present disclosure, in case that, for the terminal, the network device configures the SRS resource sets corresponding to the plurality of cooperative TRPs respectively, the first activation indication is sent through the network device, so as to activate, in the plurality of cooperative TRPs, the terminal to independently transmit the PUSCH to the single TRP or cooperatively transmit the PUSCH to the plurality of TRPs, thereby achieving dynamic switching between the single TRP and the plurality of TRPs.

In embodiments of the present disclosure, the terminal may receive the first activation indication, and independently transmit the PUSCH according to the single TRP activated by the first activation indication, or cooperatively transmit the PUSCH to the plurality of TRPs based on the plurality of TRPs activated by the first activation indication.

In case that the terminal is configured with the SRS resource set corresponding to each of the plurality of the cooperative TRPs, the network device sends the first activation indication. The first activation indication is configured to configure the terminal in the plurality of the cooperative TRPs to independently transmit the PUSCH to the single TRP or cooperatively transmit the PUSCH to the plurality of TRPs. By activating the single TRP or the plurality of TRPs, dynamic switching between the single TRP and the plurality of TRPs during the PUSCH transmission of the terminal is achieved.

Figure 3:
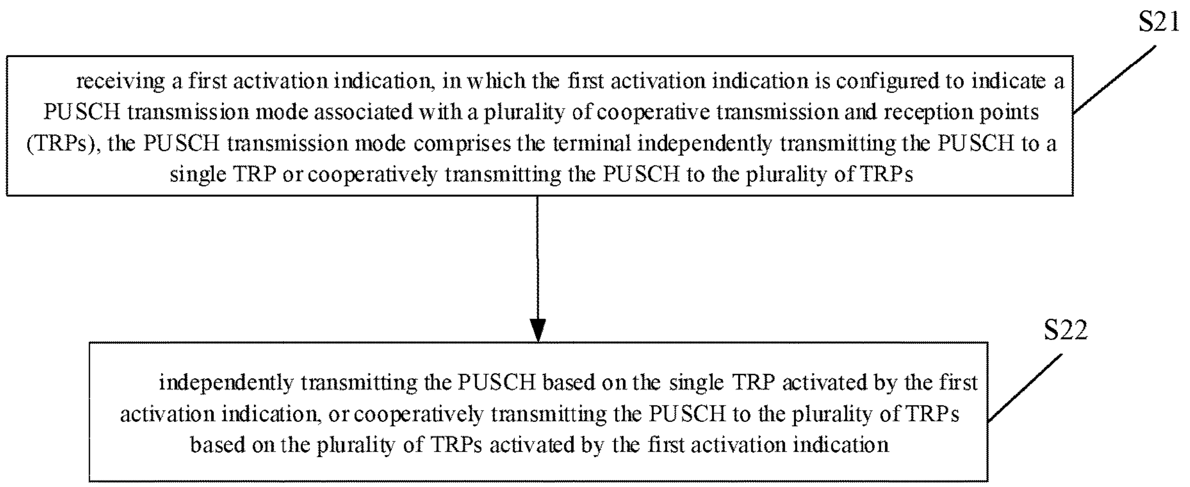
FIG. 3 is a flowchart illustrating a communication method for PUSCH according to an illustrative embodiment.

FIG. 3 is a flowchart illustrating a communication method for PUSCH according to an illustrative embodiment. As shown in FIG. 3, the communication method for the PUSCH includes the following steps.

In step S21, a first activation indication is received. The first activation indication is configured to indicate a PUSCH transmission mode associated with TRPs. The PUSCH transmission mode includes the terminal independently transmitting the PUSCH to a single TRP or cooperatively transmitting the PUSCH to a plurality of TRPs.

In step S22, the PUSCH is transmitted independently based on the single TRP activated by the first activation indication, or the PUSCH is cooperatively transmitted to the plurality of TRPs based on the plurality of TRPs activated by the first activation indication.

In embodiments of the present disclosure, the terminal receives the first activation indication sent by the network device for activating the single TRP or the plurality of TRPs, so that the PUSCH may be transmitted independently to the single TRP, or the PUSCH may be cooperatively transmitted to the plurality of TRPs, so as to realize dynamic switching between the single TRP and the plurality of TRPs.

In the communication method for the PUSCH provided by embodiments of the present disclosure, the plurality of cooperative TRPs configured by the network device for the terminal are expanded in a plurality of indication domains compared to the single TRP. In one embodiment, the first activation indication may be carried by a medium access control (MAC) control element (CE). That is, the MAC CE is used to indicate whether the subsequent scheduling is the single TRP (S-TRP) or the multiple TRPs (M-TRP). Based on the instructions of the MAC CE, the terminal selects the corresponding number of carrying bits in DCI0_1/0_2 for blind detection of the PDCCH.

In the communication method for the PUSCH provided by embodiments of the present disclosure, one or more SRS resource sets may be activated through the MAC CE, and each SRS resource set is associated with different TRPs. That is, one or more SRS resource sets configured for the terminal may be activated through the MAC CE.

In the communication method for the PUSCH provided by embodiments of the present disclosure, the MAC CE uses at least one of the following manners to activate one or more SRS resource sets.

A first manner is indicating an identifier of the one or more SRS resource sets. For example, the identifier of the one or more activated SRS resource sets may be notified.

A second manner is indicating one or more SRS resource sets via a bitmap. That is, the activated SRS resource sets are indicated via the bitmap.

A third manner is indicating one or more SRS resource sets via a code point. That is, the activated SRS resource sets are indicated via the code point.

Of course, in the communication method for the PUSCH provided by embodiments of the present disclosure, the implementation of the MAC CE activating the SRS resource set is not limited to the above-mentioned manners, and other manners may also be adopted.

In the communication method for the PUSCH provided by embodiments of the present disclosure, the TRP cooperative transmission status of the PUSCH may be indicated through the MAC CE. The TRP cooperative transmission status includes independently transmitting the PUSCH for the single TRP, or cooperatively transmitting the PUSCH for the plurality of TRPs. That is, in embodiments of the present disclosure, the MAC-CE may be used to indicate entering an S-TRP transmission status or an M-TRP transmission status. The MAC-CE is used to indicate the specific transmission status of the terminal, that is, whether a subsequent transmission is in the S-TRP status or the M-TRP status. A physical layer may further select and schedule which the SRS resource set corresponding to the TRP is used.

In the communication method for the PUSCH provided by embodiments of the present disclosure, in another implementation, the first activation indication may be carried through group common (GC)-DCI. That is, in embodiments of the present disclosure, the TRP cooperative transmission status of the PUSCH may be indicated through the GC-DCI, that is, the PUSCH may be indicated to subsequently enter the S-TRP transmission status or the M-TRP transmission status through the GC-DCI.

In the communication method for the PUSCH provided by embodiments of the present disclosure, the GC-DCI includes an information domain for indicating the TRP cooperative transmission status of the PUSCH, which is subsequently referred to as a first information domain. The first information domain is configured to indicate the TRP cooperative transmission status of the PUSCH. The TRP cooperative transmission status includes independently transmitting the PUSCH to the single TRP (S-TRP transmission status) or cooperatively transmitting the PUSCH to the plurality of TRPs (M-TRP transmission status).

In one embodiment, in response to the TRP cooperative transmission status including independently transmitting the PUSCH to the single TRP, the first information domain is configured to indicate a corresponding activated SRS resource set, and the activated SRS resource set is associated with a PUSCH transmission of the TRP to which the PUSCH is transmitted.

In another embodiment, in response to the TRP cooperative transmission status including cooperatively transmitting the PUSCH to the plurality of TRPs, the first information domain is configured to indicate at least one of: a cooperative transmission status to the plurality of TRPs or a cooperative transmission sequence for indicating different PUSCH transmission opportunities to the plurality of TRPs; a correspondence between a transmission parameter indication domain and a PUSCH transmission to different TRPs; or a correspondence between the SRS resource set and a corresponding PUSCH transmission to different TRPs.

In an example, when the TRP cooperative transmission status indicated by the GC-DCI is S-TRP or M-TRP, the GC-DCI corresponds to 1 or 2 DCI domains. DCI may be redefined to support TRP ordering, that is, schedule the corresponding TRP rollovers.

In embodiments of the present disclosure, by using the GC-DCI for a group of terminals that use the same radio network tempory identity (RNTI), the network device may notify each terminal of the subsequent scheduled PUSCH transmission status (TRP cooperative transmission status), that is, independently transmitting the PUSCH to the single TRP (S-TRP transmission status) or cooperatively transmitting the PUSCH to the plurality TRPs (M-TRP transmission status).

In an example, in embodiments of the present disclosure, 1 bit in the GC-DCI may be defined to indicate whether the scheduling is the S-TRP transmission or the M-TRP transmission. For example, in Table 11, "0" represents S-TRP and "1" represents M-TRP.

TABLE 11

| Bit field mapped to index | Transmission state |
|---|---|
| 0 | S-TRP |
| 1 | M-TRP |

Referring to Table 12, if it indicates 2, it means that the transmission is m-TRP transmission. If it indicates 0, it means that the transmission is a single TRP transmission, and TRP1 is used.

TABLE 12

| Bit field mapped to index | Transmission state |
|---|---|
| 0 | TRP 1 |
| 1 | TRP 2 |
| 2 | M-TRP |
| 3 | Reserved |

Furthermore, in embodiments of the present disclosure, the GC-DCI may also specifically indicate a corresponding activated SRS resource set, and the activated SRS resource set is associated with the PUSCH transmission of the TRP to which the PUSCH is transmitted. For example, in Table 13, GC-DCI is defined to include activated TRP indication information. If it indicates 2, it means that the transmission is m-TRP transmission. In enhanced domains in the DCI, the first one corresponds to the SRS resource set 1 (TRP1), and the second one corresponds to the SRS resource set 2 (TRP2). If it indicates 3, it means that the transmission is m-TRP transmission. In the enhanced domains in the DCI, the first one corresponds to the SRS resource set 2 (TRP2), and the second one corresponds to the SRS resource set 1 (TRP1). If it indicates 0, it means that the single TRP transmission is sent and TRP1 is used.

TABLE 13

| Bit field mapped to index | Transmission state |
|---|---|
| 0 | TRP 1 |
| 1 | TRP 2 |
| 2 | M-TRP(TRP1&TRP2) |
| 3 | M-TRP(TRP2&TRP1) |

In embodiments of the present disclosure, the TRP cooperative transmission status of the PUSCH is indicated through the GC-DCI, that is, the PUSCH is indicated to subsequently enter the S-TRP transmission status or the M-TRP transmission status through the GC-DCI. The network device subsequently schedules the PUSCH according to the selected transmission mode, and the terminal correspondingly selects the corresponding number of carrying bits in DCI0_1/0_2 for blind detection of the PDCCH.

In another embodiment of the communication method for the PUSCH provided by embodiments of the present disclosure, the first activation indication may be indicated through an independent indication domain carried on the DCI.

In one embodiment, an embodiment of the present disclosure may add a DCI domain in the DCI to indicate the TRP cooperative transmission status of the PUSCH. For example, a DCI domain is added in an enhanced DCI 0_1/0_2 supporting multi-TRP transmission to indicate S-TRP or M-TRP. In embodiments of the present disclosure, for the convenience of description, the newly added DCI domain in the DCI is referred to as the first DCI domain. The first DCI domain is configured to indicate the TRP cooperative transmission status of the PUSCH. The TRP cooperative transmission status includes independently transmitting the PUSCH to the single TRP or cooperatively transmitting the PUSCH to the plurality of TRPs.

In an example, the DCI is defined as 1 bit indicating whether the scheduling is S-TRP transmission or M-TRP transmission. For example, in Table 14, “0” represents S-TRP, and “1” represents M-TRP.

TABLE 14

| Bit field mapped to index | Transmission state |
|---|---|
| 0 | S-TRP |
| 1 | M-TRP |

Furthermore, in the communication method for the PUSCH provided by embodiments of the present disclosure, the TRP indicated in the first DCI domain has a corresponding relationship with at least one signaling of a sounding reference signal resource indicator (SRI), a transmission precoding matrix indicator (TPMI) or a transmit power control (TPC). In embodiments of the present disclosure, after the terminal obtains the information corresponding to the DCI including the first DCI domain, the information may be further used to demodulate SRI/TPMI/TPC or other domains. For example, the first SRI/TPMI/TPC domain takes effect by default.

In the communication method for the PUSCH provided by embodiments of the present disclosure, in response to the TRP cooperative transmission status including independently transmitting the PUSCH to the single TRP, the first DCI domain is configured to indicate the activated TRP. That is, the TRP indication information including activation is defined in the DCI.

In an example, as shown in Table 15, if the first DCI field indicates 2, it means that the transmission is m-TRP. If the first DCI field indicates 0, it means that the transmission is a single TRP transmission, and TRP1 is used.

TABLE 15

| Bit field mapped to index | Transmission state |
|---|---|
| 0 | TRP 1 |
| 1 | TRP 2 |
| 2 | M-TRP |
| 3 | Reserved |

Further, in the communication method for the PUSCH provided by embodiments of the present disclosure, the TRP indicated in the first DCI domain has a corresponding relationship with at least one signaling of the SRI, the TPMI or the TPC. In embodiments of the present disclosure, after the terminal obtains the information corresponding to the DCI including the first DCI domain, the information may be further used for demodulation of SRI/TPMI/TPC or other domains. For example, the first SRI/TPMI/TPC domain takes effect by default.

In the communication method for the PUSCH provided by embodiments of the present disclosure, in response to the TRP cooperative transmission status including cooperatively transmitting the PUSCH to the plurality of TRPs, the first DCI domain may be used to indicate the plurality of TRP cooperative transmission statuses or to indicate a cooperative transmission sequence to the plurality of TRPs.

In an example, as shown in Table 16, if the first DCI field indicates 2, it means that the transmission is m-TRP transmission. In the enhanced domains in the DCI, the first one corresponds to the SRS resource set 1 (TRP1), and the second one corresponds to the SRS resource set 2 (TRP2). If the first DCI domain indicates 3, it means that the transmission is m-TRP transmission. In the enhanced domains in the DCI, the first one corresponds to the SRS resource set 2 (TRP2), and the second one corresponds to the SRS resource set 1 (TRP1).

If the first DCI domain indicates 0, it means that the transmission is the single TRP transmission, and TRP1 is used.

TABLE 16

| Bit field mapped to index | Transmission state |
|---|---|
| 0 | TRP 1 |
| 1 | TRP 2 |
| 2 | M-TRP(TRP1&TRP2) |
| 3 | M-TRP(TRP2&TRP1) |

Further, in the communication method for the PUSCH provided by embodiments of the present disclosure, the TRP indicated in the first DCI domain has a corresponding relationship with at least one signaling of the SRI, the TPMI or the TPC. In embodiments of the present disclosure, after the terminal obtains the information corresponding to the DCI including the first DCI domain, the information may be further used for demodulation of SRI/TPMI/TPC or other domains. For example, the first SRI/TPMI/TPC domain takes effect by default.

It is understood that in the communication method for the PUSCH provided by embodiments of the present disclosure, the specific implementation and carrying process of the first activation indication is not limited to the above-mentioned processes, and redefinition and extension of other existing DCI domains may be used to indicate S-TRP or M-TRP. That is, the first activation indication is carried through a newly added or redefined DCI domain in the DCI.

Furthermore, in embodiments of the present disclosure, the indication of S-TRP or M-TRP is implemented by redefining/extending other DCI domains, so that the terminal may demodulate the information to be used for SRI/TPMI/TPC and other domains.

The communication method for the PUSCH provided by embodiments of the present disclosure uses enhancement of MAC-CE commands or DCI commands to solve the problem of supporting dynamic switching instructions between the multi-TRP transmissions and the single TRP transmissions in various situations, supporting which TRP is used to activate indication at the same time, and further selectively supporting schedule of TRP rollovers.

It is understood that in the communication method for the PUSCH provided by embodiments of the present disclosure, the process of the first indication information indicating the TRP may be applied to the terminal alone, or to the network device alone, or to interact the terminal and the network device to realize the implementation process of PUSCH transmission.

It is noted that those skilled in the art may understand that the various implementations/embodiments mentioned above in embodiments of the present disclosure may be used in conjunction with the foregoing embodiments or may be used independently. Whether it is used alone or in combination with the foregoing embodiments, its implementation principles are similar. During the implementation of the present disclosure, some embodiments are described in the manner of being used together. Of course, those skilled in the art may understand that such an illustration is not a limitation to embodiments of the present disclosure.

Based on the same conception, embodiments of the present disclosure also provides a communication apparatus for PUSCH.

It is understood that, in order to implement the above-mentioned functions, the communication apparatus for the PUSCH provided by embodiments of the present disclosure includes a corresponding hardware structure and/or software module for performing each function. Combined with the units and algorithm steps of each example disclosed in embodiments of the present disclosure, embodiments of the present disclosure may be implemented in a form of hardware or a combination of hardware and computer software. Whether a function is performed by a hardware or a computer software driving the hardware depends on the specific application and design constraints of the technical solution. Those skilled in the art may use different methods to implement the described functions for each specific application, but such implementation is not considered to extend beyond the scope of the technical solutions of embodiments of the present disclosure.

Figure 4:
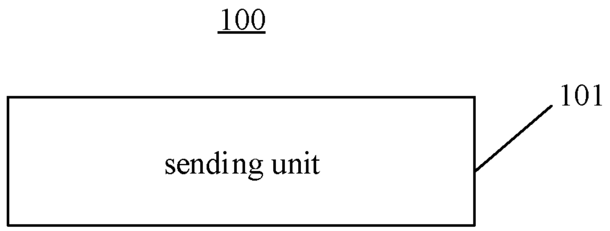
FIG. 4 is a block diagram illustrating a communication apparatus for PUSCH according to an illustrative embodiment.

FIG. 4 is a block diagram showing a communication apparatus for PUSCH according to an illustrative embodiment. Referring to FIG. 4, the communication apparatus 100 for the PUSCH includes a sending unit 101. The communication apparatus 100 for the PUSCH may be applied to a network device.

The sending unit 101 is configured to send a first activation indication in response to configuring, for a terminal, sounding reference signal (SRS) resource sets corresponding to a plurality of cooperative transmission and reception points (TRPs). The first activation indication is configured to indicate a PUSCH transmission mode associated with the plurality of TRPs, and the PUSCH transmission mode includes the terminal independently transmitting the PUSCH to a single TRP or cooperatively transmitting the PUSCH to the plurality of TRPs.

In one embodiment, the first activation indication is carried by a media access control element (MAC CE).

In one embodiment, the MAC CE is configured to activate one or more SRS resource sets, and each SRS resource set is associated with a different TRP.

In one embodiment, the MAC CE activates one or more SRS resource sets by using at least one of:

indicating an identifier of the one or more SRS resource sets; indicating the one or more SRS resource sets via a bitmap; indicating the one or more SRS resource sets via a code point.

In one embodiment, the MAC CE is configured to indicate a TRP cooperative transmission status of the PUSCH, and the TRP cooperative transmission status includes independently transmitting the PUSCH to the single TRP or cooperatively transmitting the PUSCH to the plurality of TRPs.

In one embodiment, the first activation indication is carried by grouped common downlink control information (GC-DCI).

In one embodiment, the grouped common DCI includes a first information domain, the first information domain is configured to indicate a TRP cooperative transmission status of the PUSCH, and the TRP cooperative transmission status includes independently transmitting the PUSCH to the single TRP or cooperatively transmitting the PUSCH to the plurality of TRPs.

In one embodiment, in response to the TRP cooperative transmission status including independently transmitting the PUSCH to the single TRP, the first information domain is configured to indicate a corresponding activated SRS resource set, the activated SRS resource set is associated with a PUSCH transmission of the TRP to which the PUSCH is transmitted.

In one embodiment, in response to the TRP cooperative transmission status including cooperatively transmitting the PUSCH to the plurality of TRPs, the first information domain included in the DCI is configured to indicate at least one of:

a cooperative transmission status to the plurality of TRPs or a cooperative transmission sequence for indicating different PUSCH transmission opportunities to the plurality of TRPs; a correspondence between a transmission parameter indication domain and a PUSCH transmission to different TRPs; a correspondence between the SRS resource set and a corresponding PUSCH transmission to different TRPs.

In one embodiment, the first activation indication is indicated via an independent indication domain carried on downlink control information (DCI).

In one embodiment, the DCI includes a first DCI domain, the first DCI domain is configured to indicate the TRP cooperative transmission status of the PUSCH, and the TRP cooperative transmission status includes independently transmitting the PUSCH to a single TRP or cooperatively transmitting the PUSCH to the plurality of TRPs.

In one embodiment, in response to the TRP cooperative transmission status including independently transmitting the PUSCH to the single TRP, the first DCI domain is configured to indicate an activated TRP.

In one embodiment, in response to the TRP cooperative transmission status including cooperatively transmitting the PUSCH to the plurality of TRPs, the first DCI domain is configured to indicate a cooperative transmission status of the plurality of TRPs or to indicate a cooperative transmission sequence to the plurality of TRPs.

In one embodiment, the TRP indicated in the first DCI domain has a corresponding relationship with at least one signaling of a sounding reference signal resource indicator (SRI), a transmission precoding matrix indicator (TPMI) or a transmit power control (TPC).

In one embodiment, the first activation indication is carried via a newly added or redefined DCI domain in the DCI.

Figure 5:
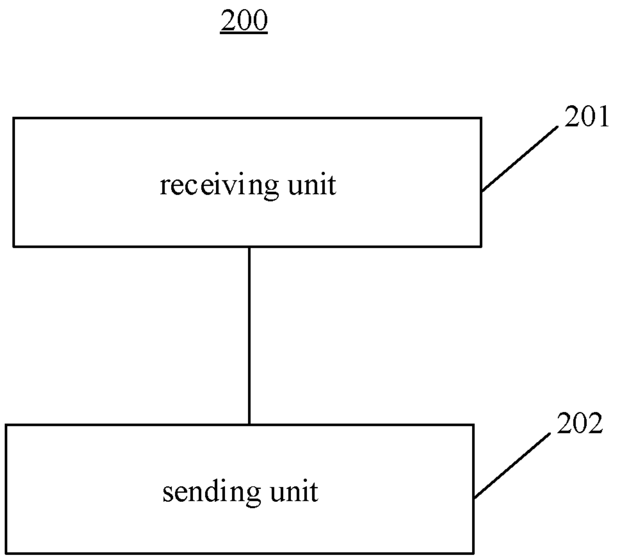
FIG. 5 is a block diagram illustrating a communication apparatus for PUSCH according to an illustrative embodiment.

FIG. 5 is a block diagram illustrating a communication apparatus for PUSCH according to an illustrative embodiment. Referring to FIG. 5, a communication apparatus 200 for the PUSCH includes a receiving unit 201 and a sending unit 202. The communication apparatus 200 for the PUSCH may be applied to a terminal.

The receiving unit 201 is configured to receive a first activation indication. The first activation indication is configured to indicate a PUSCH transmission mode associated with a plurality of cooperative transmission and reception points (TRPs), and the PUSCH transmission mode includes the terminal independently transmitting the PUSCH to a single TRP or cooperatively transmitting the PUSCH to the plurality of TRPs. The sending unit 202 is configured to independently send the PUSCH based on the single TRP activated by the first activation indication, or to cooperatively send the PUSCH to the plurality of TRPs based on the plurality of TRPs activated by the first activation indication.

In one embodiment, the first activation indication is carried by a media access control element (MAC CE).

In one embodiment, the MAC CE is configured to activate one or more SRS resource sets, and each SRS resource set is associated with a different TRP.

In one embodiment, the MAC CE activates one or more SRS resource sets by using at least one of:

- indicating an identifier of the one or more SRS resource sets;
- indicating the one or more SRS resource sets via a bitmap;
- indicating the one or more SRS resource sets via a code point.

In one embodiment, the MAC CE is configured to indicate a TRP cooperative transmission status of the PUSCH, and the TRP cooperative transmission status includes independently transmitting the PUSCH to the single TRP or cooperatively transmitting the PUSCH to the plurality of TRPs.

In one embodiment, the first activation indication is carried by grouped common downlink control information (GC-DCI).

In one embodiment, the grouped common DCI includes a first information domain, the first information domain is configured to indicate a TRP cooperative transmission status of the PUSCH, and the TRP cooperative transmission status includes independently transmitting the PUSCH to the single TRP or cooperatively transmitting the PUSCH to the plurality of TRPs.

In one embodiment, in response to the TRP cooperative transmission status including independently transmitting the PUSCH to the single TRP, the first information domain is configured to indicate a corresponding activated SRS resource set, the activated SRS resource set is associated with a PUSCH transmission of the TRP to which the PUSCH is transmitted.

In one embodiment, in response to the TRP cooperative transmission status including cooperatively transmitting the PUSCH to the plurality of TRPs, the first information domain comprised in the DCI is configured to indicate at least one of:

- a cooperative transmission status to the plurality of TRPs or a cooperative transmission sequence for indicating different PUSCH transmission opportunities to the plurality of TRPs; a correspondence between a transmission parameter indication domain and a PUSCH transmission to different TRPs; a correspondence between the SRS resource set and a corresponding PUSCH transmission to different TRPs.

In one embodiment, the first activation indication is indicated via an independent indication domain carried on downlink control information (DCI).

In one embodiment, the DCI includes a first DCI domain, the first DCI domain is configured to indicate the TRP cooperative transmission status of the PUSCH, and the TRP cooperative transmission status includes independently transmitting the PUSCH to a single TRP or cooperatively transmitting the PUSCH to the plurality of TRPs.

In one embodiment, in response to the TRP cooperative transmission status including independently transmitting the PUSCH to the single TRP, the first DCI domain is configured to indicate an activated TRP.

In one embodiment, in response to the TRP cooperative transmission status including cooperatively transmitting the PUSCH to the plurality of TRPs, the first DCI domain is configured to indicate a cooperative transmission status of the plurality of TRPs or to indicate a cooperative transmission sequence to the plurality of TRPs.

In one embodiment, the TRP indicated in the first DCI domain has a corresponding relationship with at least one signaling of a sounding reference signal resource indicator (SRI), a transmission precoding matrix indicator (TPMI) or a transmit power control (TPC).

Regarding the apparatus in the above-mentioned embodiments, the specific manners in which each module performs operations has been described in detail in embodiments related to the method, and will not be described in detail here.

Figure 6:
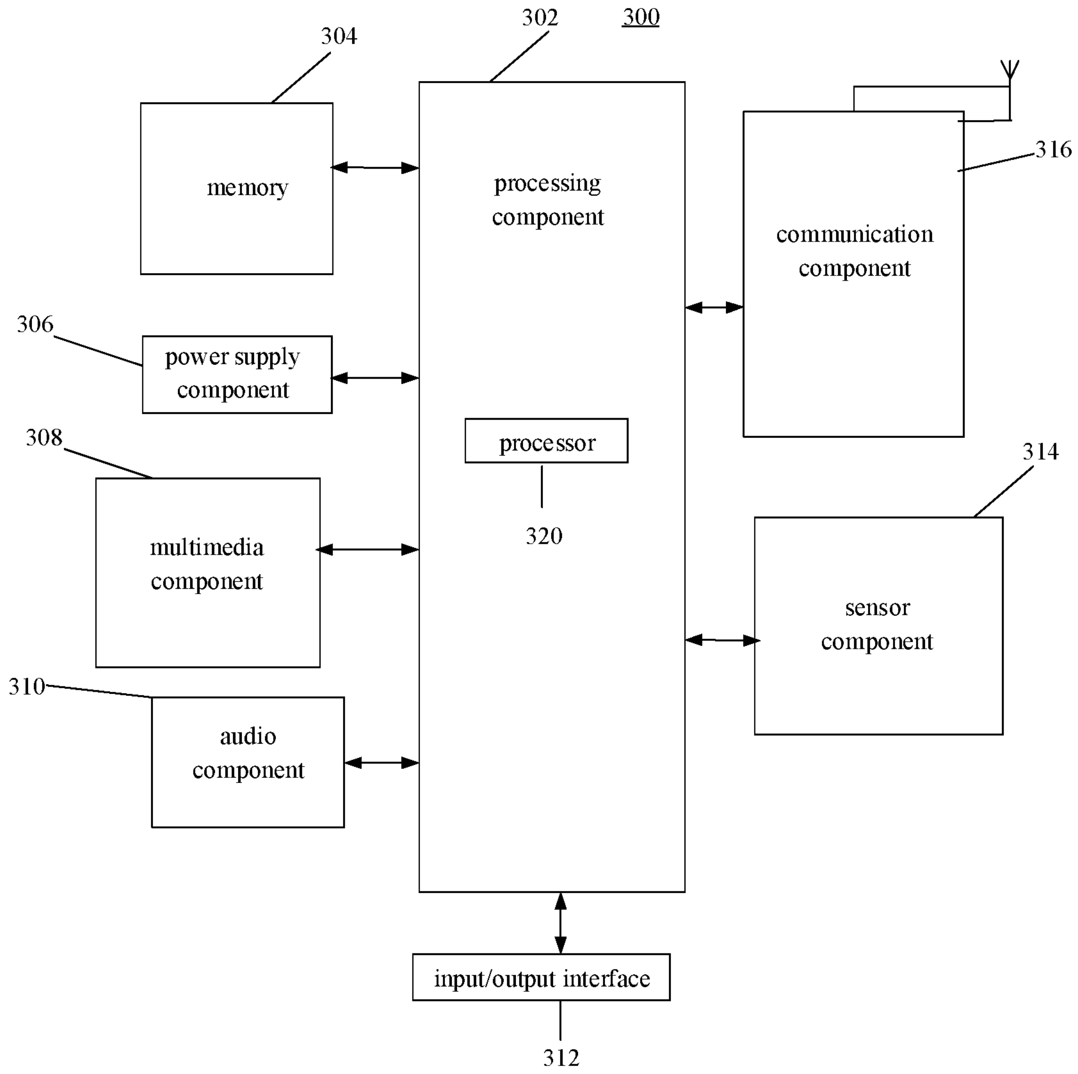
FIG. 6 is a block diagram illustrating a communication apparatus for PUSCH according to an illustrative embodiment.

FIG. 6 is a block diagram illustrating a device for PUSCH transmission according to an illustrative embodiment. For example, the device 300 may be a mobile phone, a computer, a digital broadcast terminal, a messaging device, a game console, a tablet device, a medical device, a fitness device, a personal digital assistant, or the like.

Referring to FIG. 6, the device 300 may include one or more of the following components: a processing component 302, a memory 304, a power supply component 306, a multimedia component 308, an audio component 310, an input/output (I/O) interface 312, a sensor component 314, and a communication component 316.

The processing component 302 generally controls the overall operations of the device 300, such as the operations associated with display, telephone calls, data communications, camera operations, and recording operations. The processing component 302 may include one or more processors 320 to execute instructions to complete all or part of the steps of the above-mentioned method. Additionally, the processing component 302 may include one or more modules which facilitate the interaction between the processing component 302 and other components. For example, the processing component 302 may include a multimedia module to facilitate the interaction between the multimedia component 308 and the processing component 302.

The memory 304 is configured to store various types of data to support the operations of the device 300. Examples of such data include instructions for any application or methods operated on device 300, contact data, phonebook data, messages, pictures, videos, and the like. The memory 304 may be implemented by using any type of volatile or non-volatile storage device, or a combination thereof, such as a static random access memory (SRAM), an electrically erasable programmable read-only memory (EEPROM), an erasable programmable read-only memory (EPROM), a programmable read only memory (PROM), a read-only memory (ROM), a magnetic memory, a flash memory, a magnetic or optical disk.

The power supply component 306 provides power to various components of the device 300. The power supply components 306 may include a power management system, one or more power supplies, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of a touch or a swipe action, but also sense awake time and a pressure associated with the touch or swipe action. In some embodiments, the multimedia component 308 includes a front camera and/or a rear camera. The front camera and/or the rear camera may receive an external multimedia data while the device 300 is in an operation mode, such as a photographing mode or a video mode. Each of the front camera and the rear camera may be a fixed optical lens system or have focal and optical zoom capability.

The audio component 310 is configured to output and/or input audio signals. For example, the audio component 310 includes a microphone (MIC) configured to receive an external audio signal when the device 300 is in an operation mode, such as a call mode, a recording mode and a voice recognition mode. The received audio signal may be further stored in the memory 304 or transmitted via communication component 316. In some embodiments, the audio component 310 further includes a speaker to output audio signals.

The I/O interface 312 provides an interface between the processing component 302 and peripheral interface modules, such as keyboards, click wheels, buttons, and the like. These buttons may include, but are not limited to, a home button, a volume button, a starting button, and a locking button.

The sensor component 314 includes one or more sensors to provide status assessments of various aspects of the device 300. For example, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a CMOS or CCD image sensor, for use in imaging applications. In some embodiments, the sensor component 314 may also include an acceleration sensor, a gyroscope sensor, a magnetic sensor, a pressure sensor or a temperature sensor.

The communication component 316 is configured to facilitate communication, wired or wireless, between the device 300 and other devices. The device 300 may access a wireless network based on a communication standard, such as WiFi, 2G or 3G, or a combination thereof. In illustrative embodiments, the communication component 316 receives a broadcast signal or broadcast related information from an external broadcast management system via a broadcast channel. In illustrative embodiments, the communication component 316 further includes a near field communication (NFC) module to facilitate short-range communication. For example, the NFC module may be implemented based on a radio frequency identification (RFID) technology, an infrared data association (IrDA) technology, an ultra wideband (UWB) technology, a Bluetooth (BT) technology and other technologies.

In illustrative embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, microcontroller, microprocessors, or other electronic components, for performing the above-mentioned method.

In illustrative embodiments, a non-transitory computer-readable storage medium including instructions is also provided, such as a memory 304 including instructions, which may be executed by a processor 320 of the device 300 to implement the above-mentioned method. For example, the non-transitory computer readable storage medium may be a ROM, a random access memory (RAM), a CD-ROM, a magnetic tape, a floppy disk, an optical data storage device, and the like.

Figure 7:
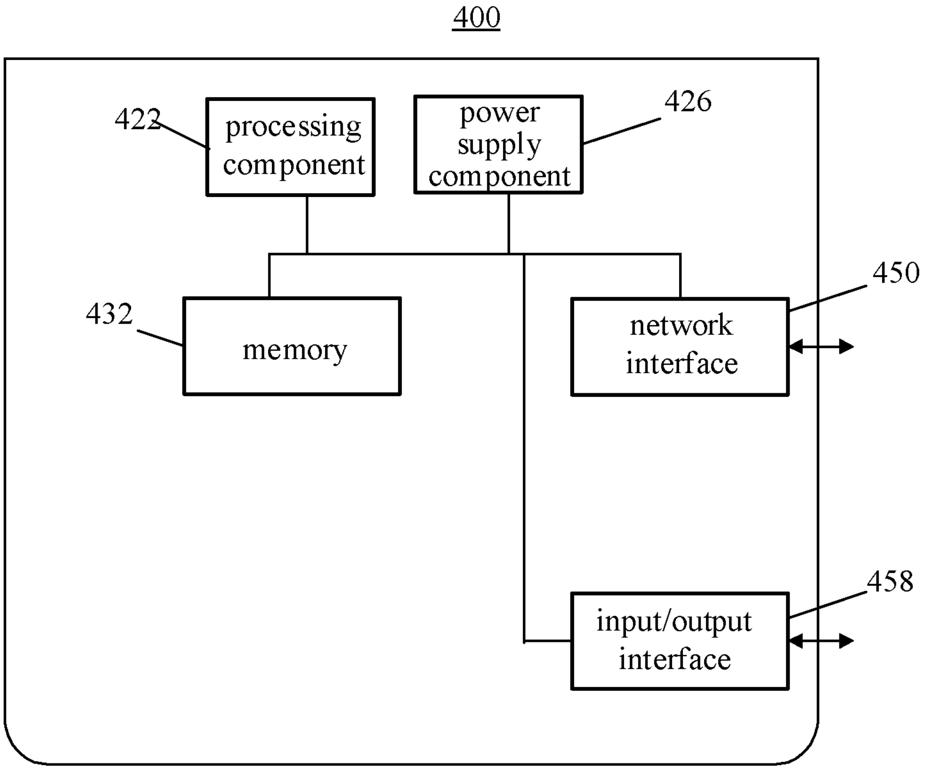
FIG. 7 is a block diagram illustrating a communication device for PUSCH according to an illustrative embodiment.

FIG. 7 is a block diagram illustrating a device for PUSCH transmission according to an illustrative embodiment. For example, the device 400 may be provided as a network device. As shown in FIG. 7, the device 400 includes a processing component 422, which further includes one or more processors, and a memory resource represented by a memory 432 for storing instructions executable by the processing component 422, such as application programs. The application program stored in the memory 432 may include one or more modules, and each of them corresponds to a set of instructions. In addition, the processing component 422 is configured to execute the instructions to perform the above-mentioned method.

The device 400 may also include a power supply component 426 configured to perform power management of the device 400, a wired or wireless network interface 450 configured to connect the device 400 to a network, and an input/output (I/O) interface 458. The device 400 may operate based on an operating system stored in the memory 432, such as Windows Server™, Mac OS X™, Unix™, Linux™, FreeBSD™ or the like.

In illustrative embodiments, a non-transitory computer-readable storage medium including instructions is also provided, such as a memory 432 including instructions, which may be executed by the processing component 422 of the device 400 to implement the above-mentioned method. For example, the non-transitory computer readable storage medium may be a ROM, a random access memory (RAM), a CD-ROM, a magnetic tape, a floppy disk, an optical data storage device, and the like. It may be further understood that "a plurality of" in the present disclosure refers to two or more, and other quantifiers are similar thereto. The term "and/or" describes a relationship between related objects, indicating that there are three relationships. For example, A and/or B may mean: A exists alone, A and B exist simultaneously, and B exists alone. The character "/" generally indicates that the contextual objects are an "or" relationship. The singular forms "a/an", "said" and "the" are also intended to include plural unless the context clearly dictates otherwise.

It is further understood that the terms "first", "second", etc. are used to describe various information, but the information should not be limited to these terms. These terms are only used to distinguish information of the same type from one another, and do not imply a specific order or degree of importance. In fact, expressions such as "first" and "second" may be used interchangeably. For example, without departing from the scope of the present disclosure, the first information may also be called the second information, and similarly, the second information may also be called the first information.

It will be further understood that although operations are described in a specific order in the drawings in embodiments of the present disclosure, this should not be understood as requiring that these operations are performed in the specific order shown or in a serial order, or that all of the operations shown are performed to obtain the desired result. In certain circumstances, multitasking and parallel processing may be advantageous.

Other embodiments of the present disclosure will be apparent to those skilled in the art from consideration of the specification and practice of the present disclosure disclosed here. The present disclosure is intended to cover any variations, uses, or adaptations of embodiments of the present disclosure following the general principles thereof and including such departures from embodiments of the present disclosure as come within known or customary practice in the art. It is intended that the specification and the examples be considered as illustrative only, with a true scope and spirit of the embodiments of the present disclosure being indicated by the following claims.

It is appreciated that embodiments of the present disclosure are not limited to the exact construction that has been described above and illustrated in the accompanying drawings, and that various modifications and changes may be made without departing from the scope thereof. It is intended that the scope of embodiments of the present disclosure only be limited by the appended claims.

What is claimed is:

1. A communication method for a physical uplink shared channel (PUSCH), applied to a network device and comprising:

sending a first activation indication in response to sounding reference signal (SRS) resource sets corresponding to a plurality of cooperative transmission and reception points (TRPs) being configured;

wherein:

the first activation indication is configured to indicate a PUSCH transmission mode associated with the plurality of TRPs, and the PUSCH transmission mode comprises independently transmitting the PUSCH to a single TRP or cooperatively transmitting the PUSCH to the plurality of TRPs;

the first activation indication is indicated via an independent indication domain carried on downlink control information (DCI);

the DCI comprises a first DCI domain, the first DCI domain is configured to indicate a TRP cooperative transmission status of the PUSCH, and the TRP cooperative transmission status comprises independently transmitting the PUSCH to a single TRP or cooperatively transmitting the PUSCH to the plurality of TRPs; and in response to the TRP cooperative transmission status comprising independently transmitting the PUSCH to the single TRP, the first DCI domain is configured to indicate an activated TRP.

2. The communication method for the PUSCH according to claim 1, wherein in response to the TRP cooperative transmission status comprising cooperatively transmitting the PUSCH to the plurality of TRPs, the first DCI domain is configured to indicate a cooperative transmission status of the plurality of TRPs or to indicate a cooperative transmission sequence to the plurality of TRPs.

3. The communication method for the PUSCH according to claim 1, wherein the TRP indicated in the first DCI domain comprised in the DCI has a corresponding relationship with at least one signaling of a sounding reference signal resource indicator (SRI), a transmission precoding matrix indicator (TPMI) or a transmit power control (TPC).

4. The communication method for the PUSCH according to claim 1, wherein the first activation indication is carried via a newly added or redefined DCI domain in the DCI.

5. The communication method for the PUSCH according to claim 1, wherein the first activation indication is carried by a media access control element (MAC CE); wherein the MAC CE is configured to activate one or more SRS resource sets, and each SRS resource set is associated with a different TRP;

wherein the MAC CE activates one or more SRS resource sets by using at least one of:

indicating an identifier of the one or more SRS resource sets;

indicating the one or more SRS resource sets via a bitmap; or indicating the one or more SRS resource sets via a code point.

6. The communication method for the PUSCH according to claim 5, wherein the MAC CE is configured to indicate a TRP cooperative transmission status of the PUSCH, and the TRP cooperative transmission status comprises independently transmitting the PUSCH to the single TRP or cooperatively transmitting the PUSCH to the plurality of TRPs.

7. The communication method for the PUSCH according to claim 1, wherein the first activation indication is carried by grouped common downlink control information (GC-DCI);

wherein the GC-DCI comprises a first information domain, the first information domain is configured to indicate a TRP cooperative transmission status of the PUSCH, and the TRP cooperative transmission status comprises independently transmitting the PUSCH to the single TRP or cooperatively transmitting the PUSCH to the plurality of TRPs;

wherein in response to the TRP cooperative transmission status comprising independently transmitting the PUSCH to the single TRP, the first information domain is configured to indicate a corresponding activated SRS resource set, the activated SRS resource set is associated with a PUSCH transmission of the TRP to which the PUSCH is transmitted.

8. The communication method for the PUSCH according to claim 7, wherein in response to the TRP cooperative transmission status comprising cooperatively transmitting the PUSCH to the plurality of TRPs, the first information domain comprised in the DCI is configured to indicate at least one of:

a cooperative transmission status to the plurality of TRPs or a cooperative transmission sequence for indicating different PUSCH transmission opportunities to the plurality of TRPs;

a correspondence between a transmission parameter indication domain and a PUSCH transmission to different TRPs; or a correspondence between the SRS resource set and a corresponding PUSCH transmission to different TRPs.

9. A communication method for a physical uplink shared channel (PUSCH), applied to a terminal and comprising:

receiving a first activation indication, wherein the first activation indication is configured to indicate a PUSCH transmission mode associated with a plurality of cooperative transmission and reception points (TRPs), the PUSCH transmission mode comprises the terminal independently transmitting the PUSCH to a single TRP or cooperatively transmitting the PUSCH to the plurality of TRPs;

independently transmitting the PUSCH based on the single TRP activated by the first activation indication, or cooperatively transmitting the PUSCH to the plurality of TRPs based on the plurality of TRPs activated by the first activation indication;

wherein:

the first activation indication is indicated via an independent indication domain carried on downlink control information (DCI);

the DCI comprises a first DCI domain, the first DCI domain is configured to indicate a TRP cooperative transmission status of the PUSCH, and the TRP cooperative transmission status comprises independently transmitting the PUSCH to a single TRP or cooperatively transmitting the PUSCH to the plurality of TRPs; and in response to the TRP cooperative transmission status comprising independently transmitting the PUSCH to the single TRP, the first DCI domain is configured to indicate an activated TRP.

10. The communication method for the PUSCH according to claim 9, wherein in response to the TRP cooperative transmission status comprising cooperatively transmitting the PUSCH to the plurality of TRPs, the first DCI domain is configured to indicate a cooperative transmission status of the plurality of TRPs or to indicate a cooperative transmission sequence to the plurality of TRPs.

11. The communication method for the PUSCH according to claim 9, wherein the TRP indicated in the first DCI domain has a corresponding relationship with at least one signaling of a sounding reference signal resource indicator (SRI), a transmission precoding matrix indicator (TPMI) or a transmit power control (TPC).

12. The communication method for the PUSCH according to claim 9, wherein the first activation indication is carried via a newly added or redefined DCI domain in the DCI.

13. The communication method for the PUSCH according to claim 9, wherein the first activation indication is carried by a media access control element (MAC CE); wherein the MAC CE is configured to activate one or more SRS resource sets, and each SRS resource set is associated with a different TRP;

wherein the MAC CE activates one or more SRS resource sets by using at least one of:

indicating an identifier of the one or more SRS resource sets;

indicating the one or more SRS resource sets via a bitmap; or indicating the one or more SRS resource sets via a code point.

14. The communication method for the PUSCH according to claim 13, wherein the MAC CE is configured to indicate a TRP cooperative transmission status of the PUSCH, and the TRP cooperative transmission status comprises independently transmitting the PUSCH to the single TRP or cooperatively transmitting the PUSCH to the plurality of TRPs.

15. The communication method for the PUSCH according to claim 9, wherein the first activation indication is carried by grouped common downlink control information (GC-DCI);

wherein the GC-DCI comprises a first information domain, the first information domain is configured to indicate a TRP cooperative transmission status of the PUSCH, and the TRP cooperative transmission status comprises independently transmitting the PUSCH to the single TRP or cooperatively transmitting the PUSCH to the plurality of TRPs;

wherein in response to the TRP cooperative transmission status comprising independently transmitting the PUSCH to the single TRP, the first information domain is configured to indicate a corresponding activated SRS resource set, the activated SRS resource set is associated with a PUSCH transmission of the TRP to which the PUSCH is transmitted.

16. The communication method for the PUSCH according to claim 15, wherein in response to the TRP cooperative transmission status comprising cooperatively transmitting the PUSCH to the plurality of TRPs, the first information domain comprised in the DCI is configured to indicate at least one of:

a cooperative transmission status to the plurality of TRPs or a cooperative transmission sequence for indicating different PUSCH transmission opportunities to the plurality of TRPs;

a correspondence between a transmission parameter indication domain and a PUSCH transmission to different TRPs; or a correspondence between the SRS resource set and a corresponding PUSCH transmission to different TRPs.

17. A communication device for a physical uplink shared channel (PUSCH), comprising:

a processor;

a memory storing machine-readable instructions that, when executed by the processor, cause the processor to:

send a first activation indication in response to sounding reference signal (SRS) resource sets corresponding to a plurality of cooperative transmission and reception points (TRPs) being configured;

wherein the first activation indication is configured to indicate a PUSCH transmission mode associated with the plurality of TRPs, and the PUSCH transmission mode comprises independently transmitting the PUSCH to a single TRP or cooperatively transmitting the PUSCH to the plurality of TRPs;

wherein:

the first activation indication is indicated via an independent indication domain carried on downlink control information (DCI);

the DCI comprises a first DCI domain, the first DCI domain is configured to indicate a TRP cooperative transmission status of the PUSCH, and the TRP cooperative transmission status comprises independently transmitting the PUSCH to a single TRP or cooperatively transmitting the PUSCH to the plurality of TRPs; and in response to the TRP cooperative transmission status comprising independently transmitting the PUSCH to the single TRP, the first DCI domain is configured to indicate an activated TRP.

18. The communication device for the PUSCH according to claim 17, wherein in response to the TRP cooperative transmission status comprising cooperatively transmitting the PUSCH to the plurality of TRPs, the first DCI domain is configured to indicate a cooperative transmission status of the plurality of TRPs or to indicate a cooperative transmission sequence to the plurality of TRPs.

19. The communication device for the PUSCH according to claim 17, wherein the TRP indicated in the first DCI domain has a corresponding relationship with at least one signaling of a sounding reference signal resource indicator (SRI), a transmission precoding matrix indicator (TPMI) or a transmit power control (TPC).

20. The communication device for the PUSCH according to claim 17, wherein the first activation indication is carried via a newly added or redefined DCI domain in the DCI.

* * * * *